2,885,321

TREATING POULTRY RESPIRATORY INFECTIONS WITH ERYTHROMYCIN

Robert H. Hollis, Northbrook, Ill., assignor to Abbott Laboratories, North Chicago, Ill., a corporation of Illinois No Drawing. Application June 16, 1955
Serial No. 516,019

5 Claims. (Cl. 167—53.1)

This invention relates to the art of veterinary internal medicine and more particularly to the pharmacological treatment of poultry with salts of the antibiotic erythromycin. Poultry, especially chickens and turkeys, is susceptible to a wide variety of diseases which cause the poultry grower great losses both from death of the poultry and from failure to grow and produce properly, due to the diseases. Chickens and turkeys are especially susceptible to respiratory infections and particularly to infection by a pleuro pneumonia-like organism (PPLO). Many chickens are lost every year from this disease alone, and the loss of productivity in infected chickens which do not die is even greater.

It is a principal object of this invention, therefore, to provide a novel veterinary composition which will be effective in the control of poultry diseases, and particularly the respiratory diseases.

Another important object of the invention is the provision of medicaments, effective in the control of poultry diseases, which medicaments may be administered to the fowl in an orally ingestable vehicle.

In the accomplishment of the foregoing objects and in accordance with the practice of this invention, there is now provided a veterinary composition effective in the control of respiratory infections in poultry, comprising an orally ingestable vehicle containing a small, but effective non-toxic amount of an erythromycin salt. The salt may be erythromycin stearate, erythromycin sulfamate, erythromycin thiocyanate and like salts, said salt being present in an amount not less than 0.0025% by weight of the composition. As previously stated, the active ingredients are desirably administered in a vehicle adapted for oral ingestion, and preferably in such substances as are within the category of poultry feed and drinking water.

The erythromycin salts referred to herein are prepared by known methods from erythromycin base and the suitable acid. For example, erythromycin stearate is prepared by dissolving erythromycin base in methanol and adding stearic acid with warming of the solution. Upon dilution with water and cooling to room temperature, needle-like crystals of erythromycin stearate beigin to separate. Erythromycin sulfamate is prepared in a similar fashion by obtaining an amyl acetate solution of erythromycin base and adding a solvent solution of sulfamic acid. A white solid having high erythromycin activity is obtained. Erythromycin thiocyanate can be made by an analogous reaction by obtaining an amyl acetate solution of erythromycin base and treating it with sodium thiocyanate. Upon addition of acetic acid to raise the pH to approximately neutral, a precipitate of erythromycin thiocyanate is formed.

Erythromycin is a highly useful antibiotic obtained by the action of Streptomyces erythreus on a nutritive culture medium. It is a basic compound which can be isolated in relatively pure form as a white solid which is only sparingly soluble, the solubility in water at ordinary temperature being about 1–2 mg./cc.

The erythromycin containing composition of this invention exhibits the characteristic antibacterial spectrum of erythromycin base (see Bunch et al. U.S. Patent No. 2,653,899). The new compositions may be used in combatting the gram positive infections such as staphylococcus and streptococcus infections in the same general way that erythromycin base is effective. Particularly, the compositions of this invention are highly effective in the control of the pleuro pneumonia-like organism (PPLO) which causes a respiratory disease in fowl and the compositions of this invention control the diseases even when administered in very small dosages.

In both feed and drinking water the amount of the new composition which is contained in the feed and drinking water is adjusted so as to provide between about 5 mg./kg. and 250 mg./kg., and preferably about 25–50 mg./kg. of erythromycin activity in the amount of food or water that the average fowl will take in one day. Stated in another way, the drinking water preparation or the feed should contain between about 0.0025% and 0.2% by weight of erythromycin activity. Reference is usually made to an amount of erythromycin activity because the activity of lots of erythromycin base and of products incorporating erythromycin will vary and should be standardized against *B. subtilis*. The standard is set at 1000 units which is the activity of one milligram of pure erythromycin. Since the erythromycin salts are relatively non-toxic they can be administered in even larger amounts if desired without undue difficulties.

The following examples are given in order to describe the invention in full detail but without intending to limit the invention in any way.

EXAMPLE I

A preparation suitable for use to either drinking water or poultry feed is made up according to the following formula:

| | Grams |
|---|---|
| Erythromycin stearate (60% active giving 4.626 grams erythromycin activity) | 7.17 |
| Dye, bright orange blend | .4 |
| Oil of cinnamon | .4 |
| Duponal P.C. | 1.0 |
| Sodium citrate | 20.0 |
| Sucrose | 70.49 |

The above ingredients are carefully blended to form a free-flowing powder which is added to drinking water in the amount of about 8.6 grams per gallon. In this concentration the solid materials dissolved readily in the water and provide a composition adapted for the treatment of respiratory diseases in poultry and containing about 108 mcg. (units) of erythromycin activity per cc. of drinking water.

About 400 grams of erythromycin activity in a material corresponding to the above formula is added to one ton of poultry feed and thoroughly blended therewith. The resulting composition contains about 0.044% by weight of erythromycin activity.

EXAMPLE II

A dry free-flowing composition is prepared for addition to poultry feed or drinking water according to the following directions:

| | Grams |
|---|---|
| Erythromycin sulfamate (77% active giving 21.1 grams of erythromycin activity) | 27.4 |
| Sodium citrate | 90.8 |
| Oil of cinnamon | 1.82 |
| Bright orange dye | 1.82 |
| Duponal P. C. | 4.54 |
| Sucrose | 327 |

The ingredients listed above are blended well in dry form and combine to make a dry free-flowing powder. When 4.3 grams of the above material is added to a gallon of water a composition especially suitable for the treatment of respiratory diseases of poultry is obtained having an erythromycin activity of about 52 units per cc. The above mixture can also be blended with poultry feed in the same manner and in the same amount as given in the instructions of Example I.

EXAMPLE III

A composition is made up according to the following directions:

| | Grams |
|---|---|
| Erythromycin thiocyanate (75% active giving 4.62 g. of erythromycin activity) | 6.16 |
| Bright orange dye | .4 |
| Oil of cinnamon | .4 |
| Duponal P. C. | 1.0 |
| Sodium citrate | 20.0 |
| Sucrose | 72.04 |

The above ingredients are carefully blended into a dry free-flowing powder which is suitable for combining with drinking water or with poultry feed in the formation of compositions ideally suited for the treatment of respiratory diseases in poultry. The directions for using the above mixture in drinking water and in feed are the same as given in Examples I and II.

EXAMPLE IV

A dry free-flowing mixture is made up according to the following directions:

| | Grams |
|---|---|
| Erythromycin stearate (60% active giving 4.626 grams of erythromycin activity) | 7.71 |
| Bright orange dye | .4 |
| Oil of cinnamon | .4 |
| Duponal P. C. | 1.0 |
| Sucrose | 90.49 |

The above ingredients are blended well to form a dry free-flowing powder which may be added to poultry feed in the preparation of compositions ideally suited for the treatment of respiratory diseases in poultry. About 200 to 400 grams of a mixture compounded according to the foregoing directions is added to a ton of feed in making a new composition which contains about 0.0132% to 0.0264% by weight of erythromycin activity.

In like manner one may substitute erythromycin salts such as the sulfamate, sulfate or thiocyanate or any combination of erythromycin salts into the above formula so long as an approximately equivalent amount of erythromycin activity (about 4.626 grams of erythromycin activity) is obtained. Every erythromycin salt must be factored to take into account its percentage of activity but the determination of such a factor and the activity are routine steps readily available to any one skilled in the art.

In the foregoing Examples I, II and III it will be noted that a buffer is employed. This is done in order to protect the erythromycin from destruction in an acidic aqueous medium in which its stability is comparatively short. When buffered to a pH between about 6 and 8 the erythromycin retains substantially all of its initial activity for periods exceeding 24 hours. The amount of buffer added to the above compositions need only be that amount which will maintain the pH of an aqueous solution thereof between about 6 and 8 for a period of 24 hours. This amount can be determined quite readily by any one reasonably familiar with this art by routine examination. There is no danger in adding an excess of the non-toxic, water-soluble buffers which fall within the scope of the present invention because the excess merely acts as a carrier or vehicle in the same way that the other ingredients of the composition act.

While sodium citrate is described in the examples as a preferred buffer, it will be apparent that any non-toxic, water-soluble acid neutralizing base or salt of a strong base and a weak acid may be employed with equivalent results. For example, sodium acetate, sodium phosphate, disodium hydrogen phosphate, sodium bicarbonate, and the like may be used.

In determining the dosage of erythromycin activity which should be administered to poultry in accordance with the practice of this invention, resort was had to published figures on the average consumption of drinking water by poultry. These figures are summarized briefly as follows:

*Water consumption per 100 chickens per day*

| | Gallons |
|---|---|
| Age: Up to 3 weeks | 2 |
| 3 to 6 weeks | 3 |
| 6 weeks and over | 6 |

*Water consumption per 100 turkeys per day*

| | Gallons |
|---|---|
| Age: Up to 3 weeks | 3 |
| 3 to 8 weeks | 6 |
| 8 weeks to market | 20 |

Since the consumption of food is roughly one-half that of drinking water, it will be apparent that the amount of erythromycin activity added to feed should be on the order of about twice that added to drinking water in order to give the same dosage in either vehicle.

The above novel compositions have been described principally in connection with their use in the treatment of poultry diseases but it will be understood that they may, of course, be administered to other species such as the domestic animals for the control of various diseases which are known to respond to erythromycin. For instance, in place of poultry feed, it will be quite apparent that the dry free-flowing powders described in the examples may be combined with any other animal feed either dry or wet for administration to animals. Of course, the drinking water compositions briefly described are equivalently useful in the treatment of fowl and animal alike.

Others may practice this invention in any of the numerous ways which will be suggested to one skilled in the art upon a reading of this disclosure. All such practice of the invention is considered to be covered hereby provided it falls within the scope of the appended claims.

I claim:

1. The process of treating respiratory infection in poultry which comprises introducing into the intestinal tract of the bird so infected a poultry feed containing a small but effective non-toxic amount of an erythromycin salt, said salt being present in an amount of from 0.0025% and 0.2% by weight of the composition.

2. The process of claim 1 in which the erythromycin salt is erythromycin stearate.

3. The process of treating PPLO infection in fowl which comprises introducing into the intestinal tract of the bird so infected a poultry drinking water containing a small but effective non-toxic amount of an erythromycin salt, said salt being present in an amount from 0.0025% to 0.2% by weight of the composition.

4. The process of claim 3 in which the erythromycin salt is erythromycin thiocyanate.

5. The process of treating respiratory infection in poultry which comprises introducing into the intestinal tract of the bird so infected an orally ingestible vehicle containing a small but effective non-toxic amount of an erythromycin salt, said salt being present in an amount from 0.0025% to 0.2% by weight of the composition.

(References on following page)

References Cited in the file of this patent

UNITED STATES PATENTS

| | | |
|---|---|---|
| 2,653,899 | Bunch | Sept. 29, 1953 |
| 2,748,051 | Zbornik | May 29, 1956 |
| 2,757,122 | Peterson | July 31, 1956 |

OTHER REFERENCES

Murphy: Antibiotics Annual, December 1953, Med. Encycl., N.Y.C., p. 506.

Gross: Poultry Sci., vol. 32, No. 2, March 1953, pp. 260–263.

Welch: Antibiotic Med., vol. 1, No. 2, February 1955, pp. 59–63.